J. B. BLAIR.
Apparatus for Testing Hydrocarbon Oils.
No. 139,654.  Patented June 10, 1873.
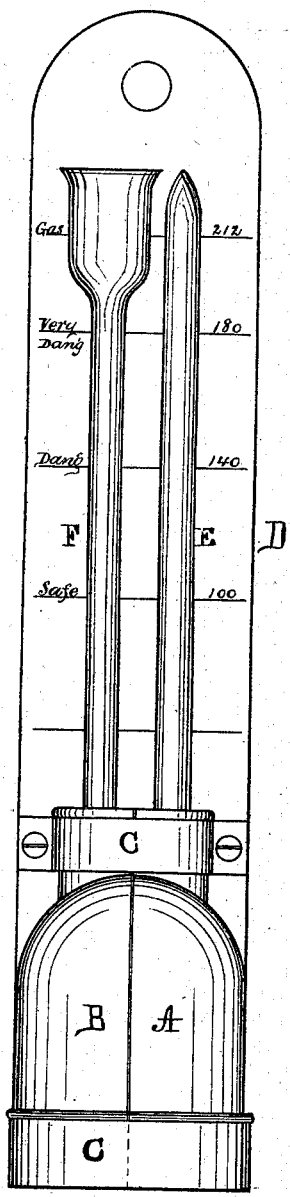
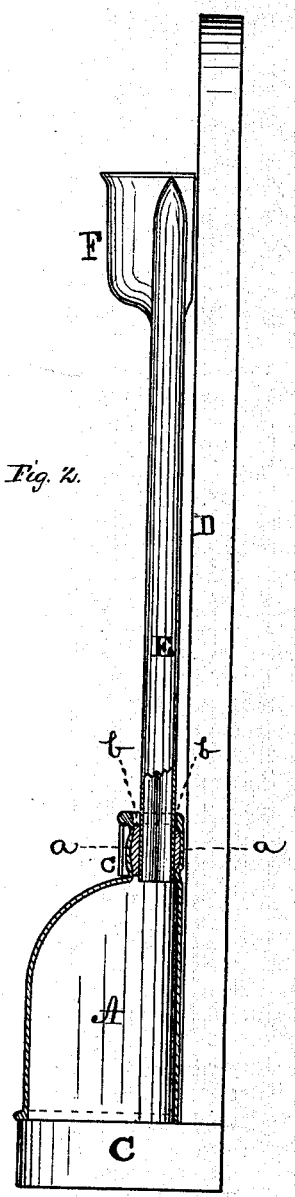

UNITED STATES PATENT OFFICE.

JOHN B. BLAIR, OF PHILADELPHIA, PENNSYLVANIA.

IMPROVEMENT IN APPARATUS FOR TESTING HYDROCARBON OILS.

Specification forming part of Letters Patent No. 139,654, dated June 10, 1873; application filed November 21, 1872.

*To all whom it may concern:*

Be it known that I, JOHN B. BLAIR, of the city and county of Philadelphia and State of Pennsylvania, have invented a new and useful Device for Testing Oil; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1 is a front or face view of the device embodying my invention. Fig. 2 is a side view thereof, partly in section.

Similar letters of reference indicate corresponding parts in the several figures.

This invention relates to an instrument or apparatus for testing coal-oil, which will be safe, reliable, and simple, and within reach of families and places of sale of the oil.

I have found that the expansion and contraction of oil under an increase of temperature varies in a ratio directly to the proportion of naphtha or other inflammable matters it contains, and that an adulteration of a safe oil with a small portion of naphtha makes the increase of expansion sufficiently remarkable to be available for my purpose.

My invention consists of an instrument that will exhibit the difference of expansion under a change of temperature between a standard oil and any other oil which it is desired to test, and by this means determine the relatively safe or dangerous character of the latter.

Referring to the drawings, A and B represent two glass bottles, vessels, or receivers, which, in general construction and capacity, are similar to each other. The bottle A is filled with an oil of ascertained quality, which shall be adopted as a standard. A glass tube, E, say six inches in length and one-eighth of an inch bore, is inserted into the mouth of the bottle A, and secured therein with rubber packing, or some other suitable cement or medium. The bottle is now placed in a cup, pan, or other holder of hot water at 212°, and when the oil has expanded so much as to fill the tube, I close the upper end of the tube by means of a suitable blow-pipe and flame, said end being previously drawn to a point in order to facilitate the closing operation.

I now withdraw the bottle from the hot water and allow it to cool, when the oil will fall in the tube to a certain height. This oil being secured from contact with the air will remain unchanged for an indefinite length of time, and, with the bottle containing it, is a permanent fixture of the instrument or apparatus.

To the other bottle, B, I attach a tube, F, of dimensions similar to tube E, but having the top left open and enlarged in order to facilitate the operation of filling and discharging the tube.

The two bottles thus prepared are now mounted side by side upon a suitable support, D, which may be made of metal, wood, or other proper material. A scale may also be marked upon the front of the support to assist the eye in determining the difference of elevation of the oil in the two tubes.

The manner of using the apparatus is as follows: I fill the empty vessel or bottle B with an oil which is to be tested through the enlarged top of the tube F, and allow it to rise to a level with the oil in the other tube, or as nearly so as may be convenient. The entire apparatus is then placed in a pan, cup, or other holder of hot water, of any degree of heat from 100° to 212°, as it may be, and the oil in both tubes will immediately begin to rise. If the specimen being tested is of the same quality as the standard oil, it will ascend in the tube at the same rate and to the same height, but if said specimen is more inflammable, then it will rise more rapidly and higher in the tube. Should the adulteration be very considerable, then the oil will rise rapidly to the top and partially fill the enlarged part of the tube, when bubbles of gas will escape, while the oil will remain at the same height until the apparatus is removed from the water.

On the scale may be marked different cautionary indications; for instance, should the tested oil rise to the second mark, while the standard oil rises to the first mark, then at the second mark may be written "unsafe," and at the next above "dangerous," and still higher "very dangerous," &c. The bottles may be secured to the support D by means of straps, bands, or other fastenings, C, and, if desired, beads or shoulders may be formed on the bottles to assist in confining the latter in place.

In order to fully retain the tubes in their respective bottles, the necks thereof may be formed with swells $a$, and rubber packings $b$ applied around the tubes, so that when the tubes are pressed into the necks the packings will fill the spaces of the swells, and being therein confined support, steady, and retain the tubes in position.

As fire is not immediately applied to the apparatus for testing purposes, the special adaptability of the invention to household usages is readily perceptible.

Having thus described my invention, what I claim as new, and desire to secure by Letters Patent, is—

The testing apparatus, consisting of the bottle A with closed tube E, as described, and the bottle B with open tube F, in connection with the graduated support B, all arranged, adapted, and operating as herein set forth.

The above signed by me this 13th day of November, 1872.

JOHN B. BLAIR.

Witnesses:
JOHN A. WIEDERSHEIM,
MILLARD L. WALTON.